United States Patent
Pushee et al.

(10) Patent No.: US 11,163,060 B1
(45) Date of Patent: Nov. 2, 2021

(54) FEATURE LOCALIZATION THROUGH BROADBAND PROCESSING

(71) Applicant: The United States of America as represented by the Secretary of the Navy, Newport, RI (US)

(72) Inventors: Kevin A Pushee, Jamestown, RI (US); Patric K Lockhart, Richmond, RI (US)

(73) Assignee: The United States of America as represented by the Secretary of the Navy

( * ) Notice: Subject to any disclaimer, the term of this patent is extended or adjusted under 35 U.S.C. 154(b) by 505 days.

(21) Appl. No.: 16/299,201

(22) Filed: Mar. 12, 2019

(51) Int. Cl.
*G01S 17/89* (2020.01)
*G01S 13/89* (2006.01)
*G01S 13/90* (2006.01)

(52) U.S. Cl.
CPC ....... *G01S 13/9005* (2013.01); *G01S 13/9011* (2013.01); *G01S 17/89* (2013.01)

(58) Field of Classification Search
CPC ... G01S 13/9005; G01S 13/9011; G01S 17/89
See application file for complete search history.

(56) References Cited

U.S. PATENT DOCUMENTS

| | | | | |
|---|---|---|---|---|
| 2006/0054824 | A1* | 3/2006 | Federici | G01S 13/89 250/339.02 |
| 2013/0222571 | A1* | 8/2013 | Kychakoff | G01N 21/3581 348/82 |
| 2015/0285907 | A1* | 10/2015 | Mohamadi | H01Q 3/24 342/21 |
| 2019/0196004 | A1* | 6/2019 | Zhao | G01S 13/34 |

* cited by examiner

*Primary Examiner* — Hugo Molina
(74) *Attorney, Agent, or Firm* — James M. Kasischke; Michael P. Stanley

(57) ABSTRACT

A method for increasing localization utilizing overlapped broadband pulses includes using a transform to convert broadband returns into wavelength based returns. The wavelength based returns are grouped into at least two wavelength group returns for each location having different focal diameters. Intra-return probabilities of object location are computed from the group returns. Inter-return probabilities are computed for overlapping regions of the pulse returns. A pixel grid is established for displaying the calculated object location probabilities. By further processing, the pixel grid can be refined to show finer details.

14 Claims, 7 Drawing Sheets

FEATURE LOCALIZATION THROUGH BROADBAND PROCESSING

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a method for improving feature localization on a surface scan by applying wavelength based imaging techniques and more particularly to a method for improving THz images by using wavelength based techniques.

(2) Description of the Prior Art

Terahertz (THz) light consists of electromagnetic waves in the frequency range of 0.1-10 THz. This frequency range corresponds to a wavelength range of 3-0.03 mm. This range lies between electronic waves (e.g., radio and microwave) and photonic waves (e.g., infrared and ultraviolet) on the electromagnetic spectrum. Until recently, bright sources of light and precise detection did not exist within the THz domain. THz technology is now an emerging area of research and development.

One main benefit of THz light is that it can pass through many common materials, such as cloth, paper, wood, and plastic. Additionally, THz radiation is biologically safe because it is non-ionizing and has low photon energies. For all of these reasons, it is well suited for use in spectroscopy and imaging. The research described here focuses on imaging applications within THz technology. Possibly the most well-known application of THz imaging is its use in security scanners to detect objects through clothing and other materials. THz imaging is also used for non-invasive medical imaging, art restoration and conservation, and industrial quality control. This technology has also been used by the National Aeronautics and Space Administration for space shuttle foam inspection.

THz imaging technology is useful for nondestructive test and evaluation (NDT&E) of systems that have nonmetallic external coatings. NDT&E is recognized as a method for decreasing total ownership cost, improving product life, and increased readiness and availability. Further, a THz imaging algorithm will be applicable to any pixelized composite of focused broadband pulses where some pixels may contain information from nearby pixels. These applications could include sonar array processing, radar processing, and microwave imaging.

In order to obtain a THz image, a pulsed THz source and detector are rastered over a sample to produce a digital image (i.e., composed of pixels). The position of the pulses defines the location of each pixel. The measured return signals define the value of each pixel. The size of each pixel is defined by the focal spot size of the pulse. It is often convenient to represent a beam as being focused to a precise point; however, this depiction of the physical phenomena is inaccurate. When light passes through an aperture, or lens, diffraction occurs. Equation (1) describes the intensity of light in the focal plane:

$$I(u) = \frac{1}{(1-\epsilon^2)^2} * \left[\frac{2*J_1(u)}{u} - \epsilon^2 * \frac{2*J_1(\epsilon u)}{\epsilon u}\right]^2 \quad (1)$$

where $\epsilon$ is the fractional radius of the central obscuration of the primary aperture (assume 0), $J_1$ is the order 1 Bessel function of the first kind, u is a dimensionless distance from the optical axis in the focal plane given by equation (2) where $\theta$ is the angular radius. $\lambda$ is the wavelength, $D_l$ is lens diameter.

$$u = \frac{\pi}{\lambda} * D_l * \theta \quad (2)$$

The pattern resulting from this diffraction is referred to as the Airy pattern. The Airy pattern is best described as a diffuse circular region, the Airy disk, surrounded by a series of concentric rings of decreasing intensity. The Airy disk represents the smallest point to which a beam of light can be focused. The Airy disk is defined as the area inside the first intensity minimum. This area contains 86% of the total energy. Because of this, the Airy disk can be considered the main lobe of the diffraction pattern. The width of this main lobe can be used as an approximation of the focal spot diameter. Solving equation (1) for the first set of minimums yields equation (3), which describes this diameter.

$$D_s = 2.44\left(\frac{f*\lambda}{D_l}\right), \quad (3)$$

where $D_s$ is the focal spot diameter, f is the focal length, $\lambda$ is the wavelength, and $D_l$ is the lens diameter. Equation (3) shows that focal spot diameter is dependent on the wavelength. Hence, if the emitted pulse contains a range of wavelengths (i.e., it is broadband), it also contains a plurality of focal spot sizes. Wavelength $\lambda$ is easily calculated from the frequency of the light using:

$$c = f_l * \lambda, \quad (4)$$

where c is the speed of light, $f_l$ is the frequency of the light, and $\lambda$ is the wavelength.

This plurality of spot sizes leads to an ambiguity in pixel size definition. The pixel size can be defined to match the largest focal spot size. With the large pixel size, the smaller spot sizes contained in the pulse fail to measure much of the pixel area. The large pixel size also results in lower image resolution. Pixel size can also be defined to match the smallest focal spot size. This results in higher image resolution. However, with the smallest pixel size, the larger spot sizes contained in the pulse measure area that is outside of the pixel. It is also possible to define the pixel size to be in between the largest and smallest spot sizes. The result is a combination of spot sizes that are smaller and larger than the defined pixels. Any of these mitigation options lead to pixel ambiguity due to mixed pixel information and/or under measured area.

The pulses described above are used to measure surface features within the area of interest. In the ideal case, these features are much larger than the pixel size, and the focal spot is the same size as the pixel. In practice, features can be on the same scale or smaller than some or all of the focal spot sizes contained in a broadband pulse. The prior art approach is to define the pixel size as a compromise between the spot sizes and the desired resolution. In the case of a grayscale image, the pixel intensity corresponds to the measured signal-to-noise ratio (SNR). Some features are less reflective. An SNR corresponding to the spot illuminating a feature results in a dark pixel, and an SNR corresponding to the background results in a light pixel. An SNR corresponding to a spot partially illuminating a feature would result in a pixel with medium intensity. Of course, this varies with the feature and the background. Some features could have high SNRs with respect to the background.

The returned SNR or intensity value for a broadband pulse is calculated from the aggregate of all of the contained wavelengths or particular filtered wavelengths. Each measurement of the return contains multiple wavelengths. In the rasterization process, the return is measured over a defined area. Then, each pixel is measured as the average of the return from all or filtered pulses incident on an area corresponding to the defined pixel size. Because of the inherent variation in the relationship between a given focal spot size, as described by equation (3), and the defined (fixed) pixel size, this approach can produce three different representations of pixel intensity for the same pixel and pulse. The variation in measured intensity inherent in this approach can lead to decreased detection and localization of a feature based on its size and location. For example, if a low reflectivity feature occupies almost all of a defined pixel, the pixel will have a low intensity because the feature is less reflective. If the feature is much smaller than a pixel, the pixel will have a relatively high intensity. An intermediate intensity can be given by a pixel covering most of a feature. Of course, the intensity will be high in absence of a feature. Localization can also be harmed even if the feature is similar in size to the pixel. This can occur if the feature is misaligned with the pixel array. The pixel array can be a grid or any other arrangement suitable for display. Misalignment of the array results in the feature being spread out among multiple pixels rather than being aligned to a single pixel.

Thus, there is a need for enhancing broadband scanning techniques to provide greater localization.

SUMMARY OF THE INVENTION

It is a first object of the present invention to provide a method for scanning features with greater precision.

Another object is to provide a method for aligning the scanned features to an analysis array to give the greatest possible definition.

Accordingly, there is provided a method for increasing localization utilizing overlapped broadband pulses includes using a transform to convert broadband returns into wavelength based returns. The wavelength based returns are grouped into at least two wavelength group returns for each location having different focal diameters. Intra-return probabilities of object location are computed from the group returns. Inter-return probabilities are computed for overlapping regions of the pulse returns. A pixel grid is established for displaying the calculated object location probabilities. By further processing, the pixel grid can be refined to show finer details.

In further detail there is provided a method for increasing accuracy in scanning optical or electromagnetic imaging that includes scanning the area to obtain broadband return values from overlapping locations. Wavelength groups of returns are selected based on the return values, the object of interest, and available equipment. The broadband return values for each location in the area are decomposed into the selected wavelength group values. Each group has a focus region with a known radius. Areas of wavelength group overlap related to adjacent locations are determined. Most likely return values can be calculated from these overlap areas, and a pixel array can be defined in alignment with the overlaps and the wavelength groups. This pixel array can be used to calculate return values for display giving enhanced feature localization.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The method disclosed herein solves the imaging problems described above by developing an image processing algorithm that dynamically defines pixel size and location by performing a spectral analysis across broadband pulses grouped adjacent to or overlapping each other to localize and define features. The basis of this solution is the ability to represent the return from each pulse in the frequency domain in order to calculate the return signal for each wavelength contained within the pulse. Since the wavelength can be correlated to focal spot diameter by using equations (3) and (4), this wavelength domain analysis allows the signal from a single pulse to be divided into the portions associated with each spot size.

The granularity with which the spot sizes can be calculated is proportional to the width of the calculated frequency bins. With each pulse separated into its component spot sizes, a spatial analysis can be performed to localize features. Once the analysis is performed and the features are localized, an appropriate image pixel size and location can be determined.

Figure 1:
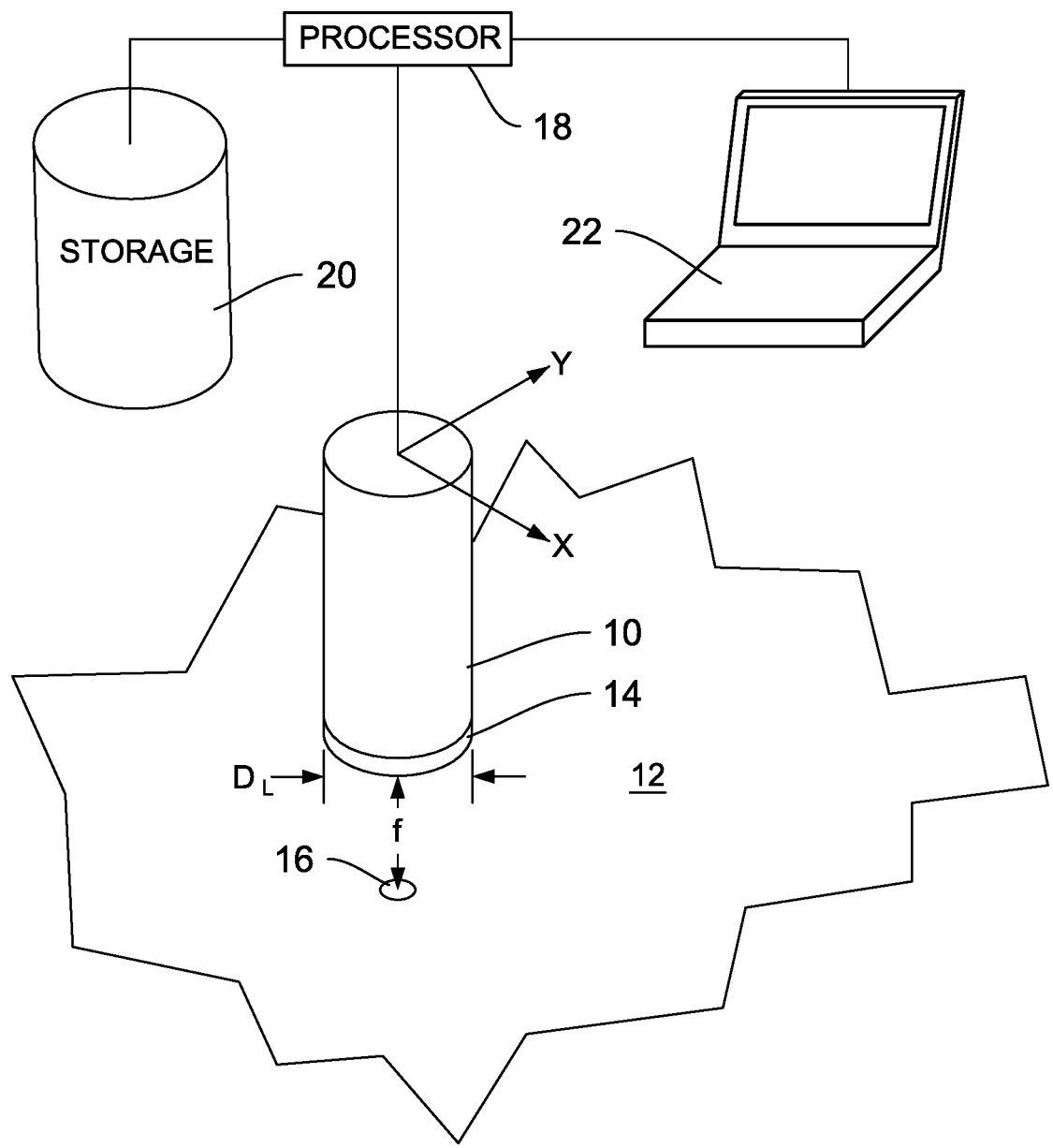
FIG. 1 is a diagram showing a hardware set-up for practicing an embodiment of the invention.

FIG. 1 shows one embodiment of the current invention. A THz imager 10 is utilized to scan a surface 12 of a specimen. Imager 10 provides a broadband pulse of electromagnetic energy having a minimum wavelength, $\lambda_{min}$, of 0.03 mm and a maximum wavelength, $\lambda_{max}$, of 3 mm. Imager 10 has a lens 14 with a known diameter, $D_L$, and focal length, f. Imager 10 provides this broadband THz radiation at a focal spot 16 and captures the reflected pulse from focal spot 16. Typically, this scanning is performed in a raster fashion with a reflected pulse being captured at each X and Y coordinate. The X-Y position and captured pulse intensity values of the focal spot are digitized and saved. Imager 10 is moved to a different X-Y position on command from a joined processor 18. X-Y scanning must be performed in sufficiently fine increments to capture overlapping reflected broadband pulses from surface 12. These reflected broadband pulses are the raw return signal. Pulses are captured in this manner until the desired surface area 12 is imaged. Captured pulses are preferably saved by processor 18 in a storage device 20 and indexed by X-Y position of the focal spot. A display means 22 can be provided and joined to processor 18 to receive user commands and to display raw images, refined images, and other system data.

Figure 2:
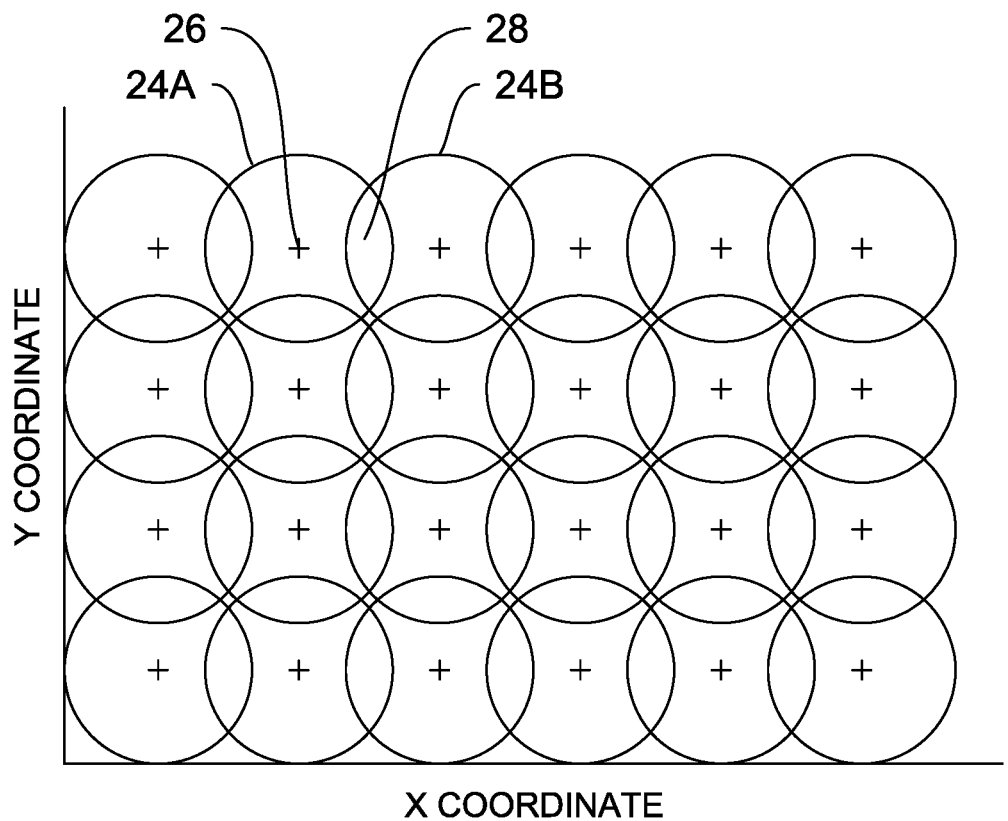
FIG. 2 is a diagram showing broadband return value capture regions.

FIG. 2 gives a representation of the collected broadband pulse returns. A first broadband pulse return is indicated at 24A. Each broadband pulse return 24A has a center 26 at a known x and y coordinate. Adjacent pulse returns, such as first broadband pulse return 24A and second broadband pulse return 24B, overlap at region 28. Overlap region 28 can be used to refine the collected images as detailed hereinafter.

Figure 3:
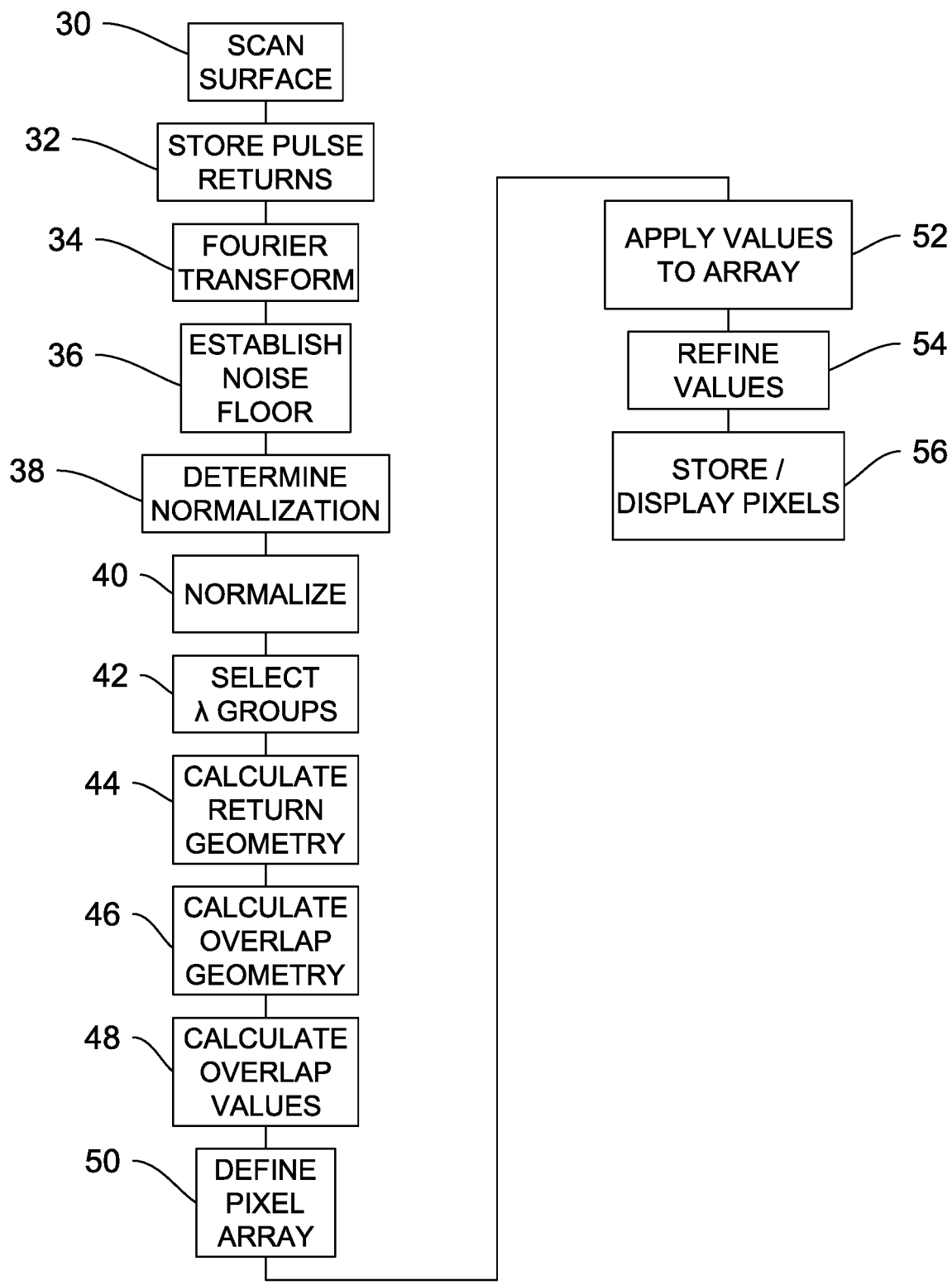
FIG. 3 is a flow chart showing one embodiment of the method.

FIG. 3 provides a flow chart of the method of one embodiment of the current invention. This embodiment is useful for scanning a surface for object locations when the user has little a priori knowledge of the features. The steps provided herein can be executed in the sequence shown or can be executed earlier or later for efficient processing. In step 30, the surface of a sample is scanned utilizing broadband pulses. Pulse returns are captured and stored in step 32. In step 34, a Fourier transform or other transform is performed on the stored pulse returns in order to convert the pulse returns to the frequency domain as wavelength based returns. A noise floor is established in step 36 based on known characteristics of the sample and the scanning process. This can be performed experimentally by using known noise power levels at certain frequencies that are characteristic of signal noise. The noise floor can be used as base level for the returns.

Overall normalization is determined in step 38 based on the values in the stored pulse returns. For example, it may be desirable that wavelength based returns are comparable with each other. This can be performed by a variety of methods known in the art. One such method includes dividing the return signal intensities for each wavelength by the area of the focal spots for that wavelength. A normalization factor or function can then be calculated to make wavelength based returns comparable. Normalization of the wavelength based returns is performed in step 40.

Groups of wavelengths $\lambda$ can be selected in step 42 from the wavelength based returns. These wavelength groups evenly or based on known parameters concerning the sample and the target feature being observed. Wavelength group focal spot geometry is calculated in step 44 based on the wavelength groups, focal length, and lens diameter. This allows an object to be localized within certain wavelength groups and their associated focus areas. The geometry of adjacent focal spots and wavelength groups focal spots is calculated in step 46 to establish the overlap regions. The probability of an object being located in an overlap region or a wavelength group focal spot can be calculated in step 48 by constraint analysis.

In step 50, a pixel array can be defined for the scan region. Pixels are preferably set to represent the minimum focal spot diameter utilizing equation (3). In one setup utilizing commercially available imaging equipment this leads to one pixel representing about 0.1 mm.

In step 52, values from the calculations of step 48 are applied to the defined pixel array. The values for each pixel can be refined to in step 54 to make them conform more closely to the calculated values. One technique for refining the pixels can be performed by defining subpixels as overlapping vertically or horizontally oriented half pixels. Values are calculated for the vertical pixels and the horizontal pixel independently. Probabilities for quarter sized pixels are established from the combined values of the overlapping vertical half pixel and horizontal half pixel. Various other techniques can be used for this in conformance with the configuration of the broadband pulse returns and the resulting display. These refined pixel values can be stored or displayed in step 56.

Figure 4:
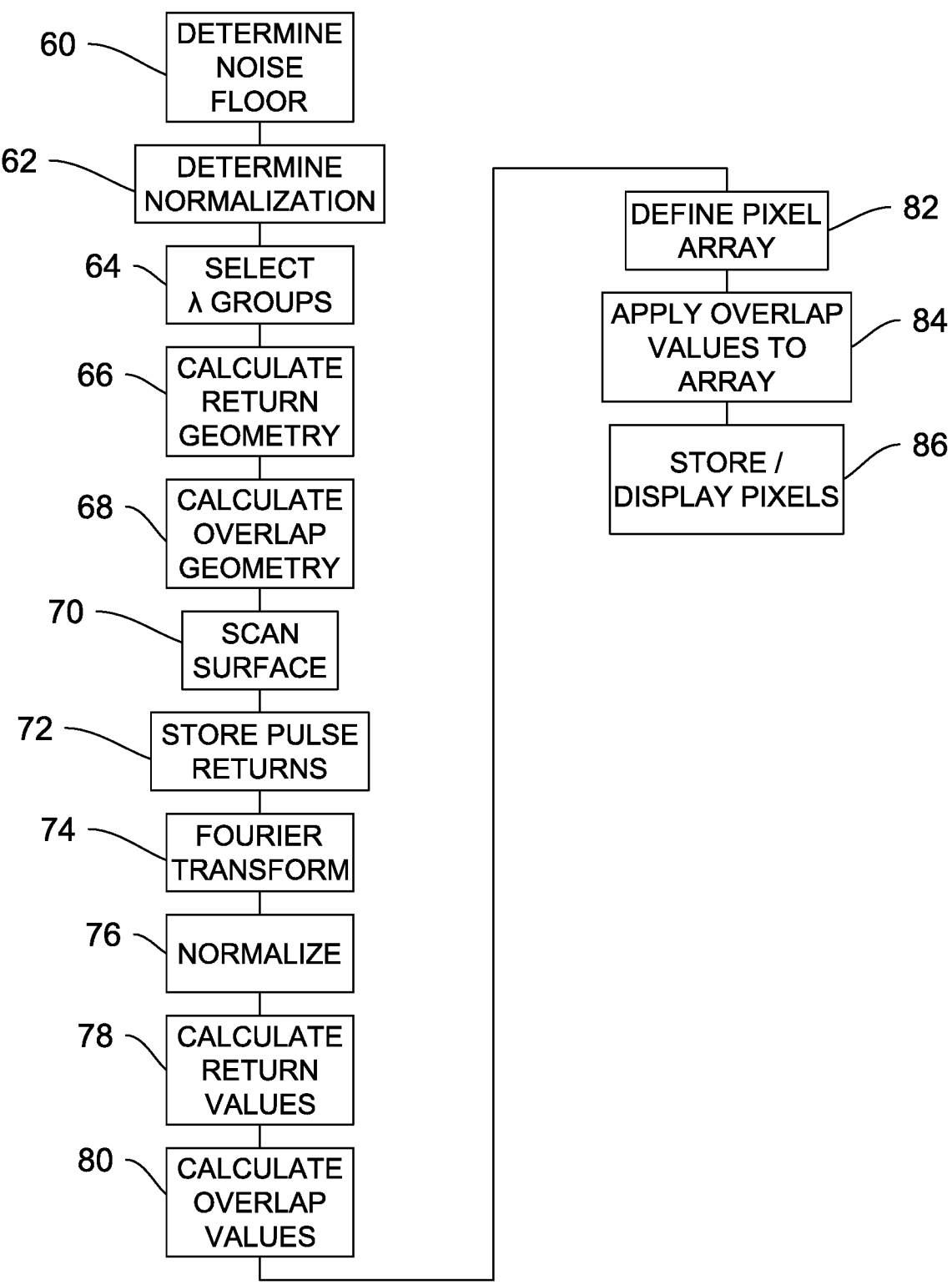
FIG. 4 is a flow chart showing another embodiment of the method.

FIG. 4 provides a flowchart for an alternate embodiment of the invention for utilization when the user has information about the surface and the type of object being detected. In step 60, the noise floor for a given surface and object can be based on past experimental determinations. Normalization can also be based on past determinations in step 62 because of information about the return characteristics of the surface. Wavelength $\lambda$ groups can be determined in step 64 before conducting the scan because the size and reflectivity of the object or objects being detected can influence the size and apportionment of wavelength groups. It may be desirable to have more groups creating wavelength group focal spots having dimensions around the size of the object of interest. It may also be desirable to have wavelength group focal spots creating overlaps that are influenced by the size of the object. Spot geometry calculations in step 66 and overlap geometry calculation in step 68 are both dependent on the wavelength groups.

In step 70, the surface can be scanned utilizing apparatus such as that described in FIG. 1. Broadband pulse returns from the scanned surface and coordinates of the returns can be stored in step 72. These broadband returns are transformed into wavelength based returns in step 74 utilizing a Fourier transform, fast Fourier transform, or some other kind of transform. These frequency domain groups can be normalized in step 76. Object location probabilities can be calculated for the wavelength based returns using intra-return analysis in step 78. This calculates the probability that an object is located in a wavelength group having a larger diameter, a smaller diameter, or both. Probabilities that the object is in an overlap region are calculated in step 80 by utilizing intra-spot analysis.

In step 82, a pixel array for display and storage is defined over the wavelength group returns and overlap regions. The pixel array grid size can be set by utilizing the known wavelength group focal spot characteristics or it can be adjusted to a minimum pixel size. Refined inter-return probabilities and intra-return probabilities can be applied to the pixel array in step 84. The pixel array can be stored or used for display on a monitor in step 86.

Figure 5:
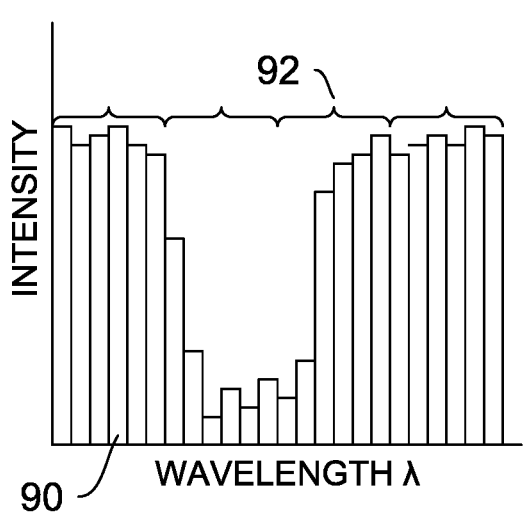
FIG. 5 shows a representation of a broadband return decomposed into wavelength returns which can be grouped.

FIG. 5 provides further illustration of the Fourier transform process for decomposing the broadband pulse return and the selection of wavelength groups. Each broadband pulse return 24A or 24B of FIG. 2 is transformed into the wavelength domain. In the simplified representation shown, the Fourier transform has twenty-four wavelength bins. A single bin is indicated at 90. Typically, Fourier transforms are conducted with a much larger number of bins. Adjacent bins can be grouped as shown at 92. This can be a linear grouping as shown in which each grouping has six bins or this could be a non-linear grouping in which fewer wavelength bins are provided at some wavelength ranges. This grouping can be selected depending on the nature of the phenomenon being identified. For example, larger features can be discerned with a larger wavelength than smaller features. Some features may have an enhanced reflectivity at some wavelengths but not at others. The selected groups can be as narrow as allowed by the Fourier transform or filter bank being used for analysis. Likewise, the number of wavelength groups is only dictated by the particular hardware. Fewer groups of wavelengths can be selected in order to reduce processing of the number of focal regions. In any case, these wavelength groups produce multiple wavelength limited pulses from each broadband return pulse. In an alternate embodiment a filter bank such as a combination of high pass, low pass and band pass filters can be utilized instead of the Fourier transform to obtain wavelength based intensity values from the broadband captured pulse.

Figure 6:
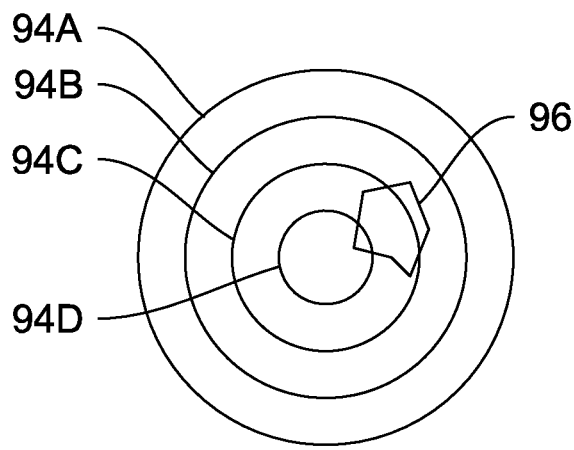
FIG. 6 shows a representation of wavelength group focus areas around an object.

As shown in FIG. 6, the Fourier transform decomposes the broadband pulse into a plurality of wavelength group focal spots 94A, 94B, 94C, and 94D. The wavelength group focal spots from the same broadband return pulse are represented as concentric circles centered on the X-Y coordinate for the position of the original broadband pulse. Returns from the shorter wavelengths result in a focal spot having a smaller diameter, and returns from the longer wavelengths give images having a larger diameter. This is given by equation (3), above. A sample object 96 is provided in this representation.

The Fourier transform representation of FIG. 5 provides a representation of returns for this type of object. Intensity or power levels for each wavelength group are normalized over the surface of the sample. The shorter wavelength returns have returns at a relatively high intensity because the object 96 is only slightly in the small diameter focus area 94D. Returns are lower for the next longer wavelength group because object 96 is most prominently in the second smallest focus circle 94C. Returns become higher in the next to longest wavelength group, and increase again to high values in the longest wavelength group.

The wavelength groups 92 can be processed further to simplify calculations by assigning discrete levels and by thresholding. Discrete levels can be assigned to the returns using the noise floor found in step 36 of FIG. 3. The noise floor can establish an error range for discrete wavelength group power levels. Minimum and maximum power level values within the range of the noise floor can be assigned to the same value as being mathematically equivalent. In thresholding, the wavelength group values having power level values within range of the noise floor can be interpreted as having the base value in absence of an object.

A basic assumption of this method is that there will be a difference in the return intensity between a feature such as object 96 and the background. By comparing the measured signal from a broadband pulse to a known reference, the probability of a feature existing within the area of the broadband pulse's focal spot can be calculated. Based on this assumption, an intra-pulse analysis can be performed on the return signal associated with each wavelength group of the broadband pulse to determine the probability of a feature or object existing at specific distances from the pulse's focal spot center. Wavelength groups can be analyzed in an inter-pulse analysis to compare the distance and probability values of overlapping wavelength groups from different broadband pulses to localize the feature to overlapping areas of high probability. Relating this to FIG. 6, intra-pulse analysis can place object 96 as being somewhere within focus area 94C but not as much in focus area 94D.

Referring back to FIG. 2, inter-pulse analysis can be used to give the value of overlap 28 between pulse return 24A and 24B. The region of return 24A can be represented as $S_1$ having an area $A_{S1}$ and the region of return 24B as $S_2$, having an area $A_{S2}$. The area of return 24A not in overlap 28 can be designated as $\alpha$, having an area $A_\alpha$. The region of 24B not in overlap 28 can be designated as $\beta$, having an area $A_\beta$. The region of overlap 28 can be designated as $\gamma$, having an area $A_\gamma$.

The maximum intensity of $S_1$ is designated as $I_{S1max}$, and the maximum intensity of $S_2$ is designated as $I_{S2max}$, and the minimum intensities are $I_{S1min}$ and $I_{S2min}$. By normalizing these intensities $I_{S1max}=I_{S2max}=1$ and $I_{S1min}=I_{S2min}=0$. A proportion $P_\alpha$ of $I_{S1max}$ can be associated with area a such that:

$$P_\alpha = \frac{A_\alpha}{A_{S1}},$$

assuming a uniform distribution over S1; or (5)

$$P_\alpha = \frac{\iint I(r,\theta) \text{ over } A_\alpha}{\iint I(r,\theta) \text{ over } A_{S1}},$$

accounting for the Airy pattern. (6)

The maximum intensity of region $\alpha$ is then $I_{\alpha max}=\min(P_\alpha, I_{S1})$ and the minimum intensity of region $\alpha$ is then $I_{\alpha min}=\max(0, I_{S1}-I_{\gamma max})$. Likewise, for region $\beta$, $I_{\beta max}=\min(P_\beta, I_{S2})$ and the minimum intensity of region $\beta$, is then $I_{\beta min}=\max(0, I_{S2}-I_{\gamma max})$. The maximum and minimum intensities, $I_{\gamma max}$ and $I_{\gamma min}$, for region $\gamma$ rely on $S_1$ and $S_2$ and $P_\gamma$ the proportion of return of $\gamma$. For $I_{\gamma max}$ this gives:

$$I_{\gamma max1}=\min(P_{\gamma 1},I_{S1}); \tag{7}$$

$$I_{\gamma max2}=\min(P_{\gamma 2},I_{S2}); \text{ and} \tag{8}$$

$$I_{\gamma max}=\min(I_{\gamma max1},I_{\gamma max2}). \tag{9}$$

For $I_{\gamma min}$ this gives:

$$I_{\gamma min1}=\max(0,I_{S1}-I_{\alpha max}); \tag{10}$$

$$I_{\gamma min2}=\max(0,I_{S2}-I_{\beta max}); \text{ and} \tag{11}$$

$$I_{\gamma min}=\max(I_{\gamma min1},I_{\gamma min2}). \tag{12}$$

This can be expanded to include the other spots and overlap regions of the coverage area. This process can also include concentric wavelength groups having multiple overlaps.

This analysis can be carried out on two dimensional scans, scans utilizing focal spots having different radii, and higher order overlaps such as those involving three or more focal spots. Other systems of constraints can be used in which a given focal spot does not have a uniform intensity or power level.

When this inter-pulse analysis is performed for all of the pulses in the area of interest, the location of overlaps with high probability can be used to localize a feature. Because these overlap areas are independent of pre-defined pixels, their physical size and location can be used to provide a pixel array that better corresponds to the feature size and location. The pixel array can be utilized to provide better localization and imaging for users on display 22 of FIG. 1.

Figure 7:
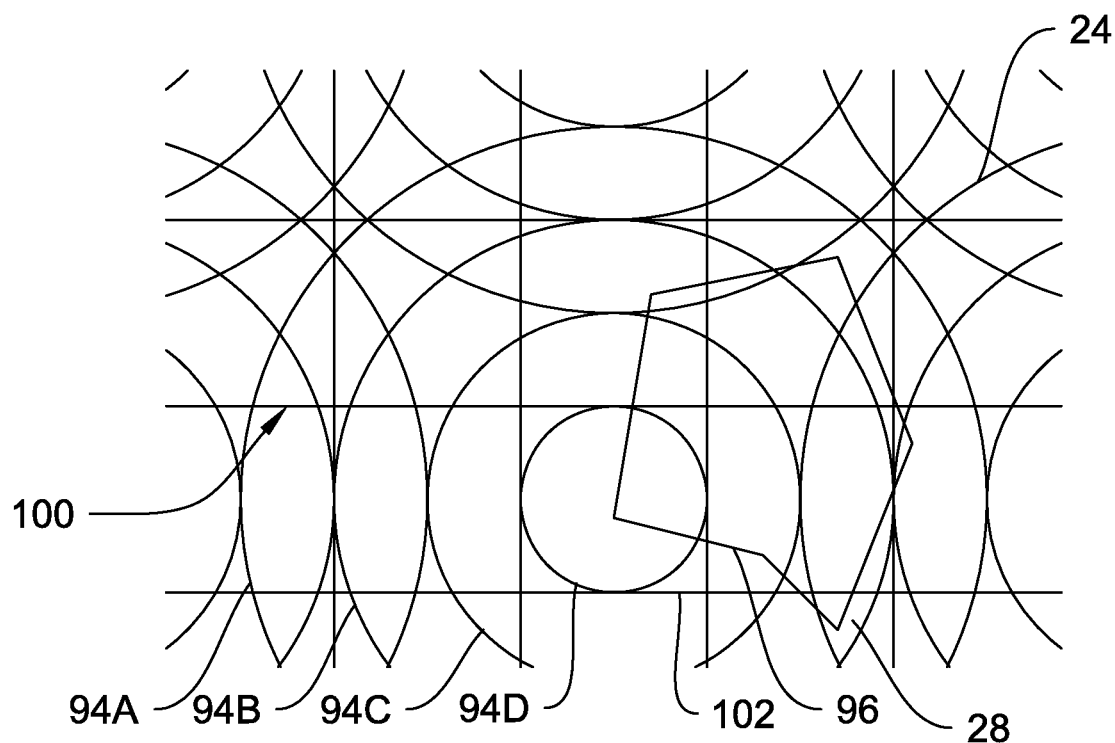
FIG. 7 shows a representation of overlapping broadband returns and wavelength groups about an object.

FIG. 7 shows a view of object 96 with the focus areas 94A, 94B, 94C, and 94D, and adjacent pulses. A pixel array 100 can be established for display and analysis of the scanned returns. In one embodiment, pixel array 100 is chosen having squares 102 with dimensions s×s where s is the diameter of the smallest focus region 94D. Squares 102 of array 100 can be aligned with focus regions such as 94D or overlap regions 28 that are likely to have object of interest 96. In an alternative embodiment, dimension s can be chosen based on the expected feature. Wavelength group focus regions 94A, 94B, 94C, and 94D can be chosen such that overlaps 96 also have a width of s in a dimension.

When an overlap intersects multiple pixels, the calculated overlap values can be split among the pixels. An adjustable threshold of overlap can be used to set pixels to zero when the portion of the overlap in a pixel is below a certain threshold. Different thresholds can be used to give different kinds of analysis.

As shown in FIGS. 8, 9, 10 and 11, is a representation of how pixel array 100 can be further refined by separating each square or pixel 102 into subpixels to give details for features. Subpixels are possible because of the smaller overlap areas given by the methods described herein. Object probabilities calculated above by inter-pulse analysis and intra-pulse analysis are shown by crosshatching in FIG. 8. Object 96 is shown for reference. Broad, single crosshatching 104 indicates a lower probability, and narrower, single crosshatching 106 indicates a higher probability. These regions conform to the overlap areas 28 and the focus regions, such as 94C.

Figure 8:
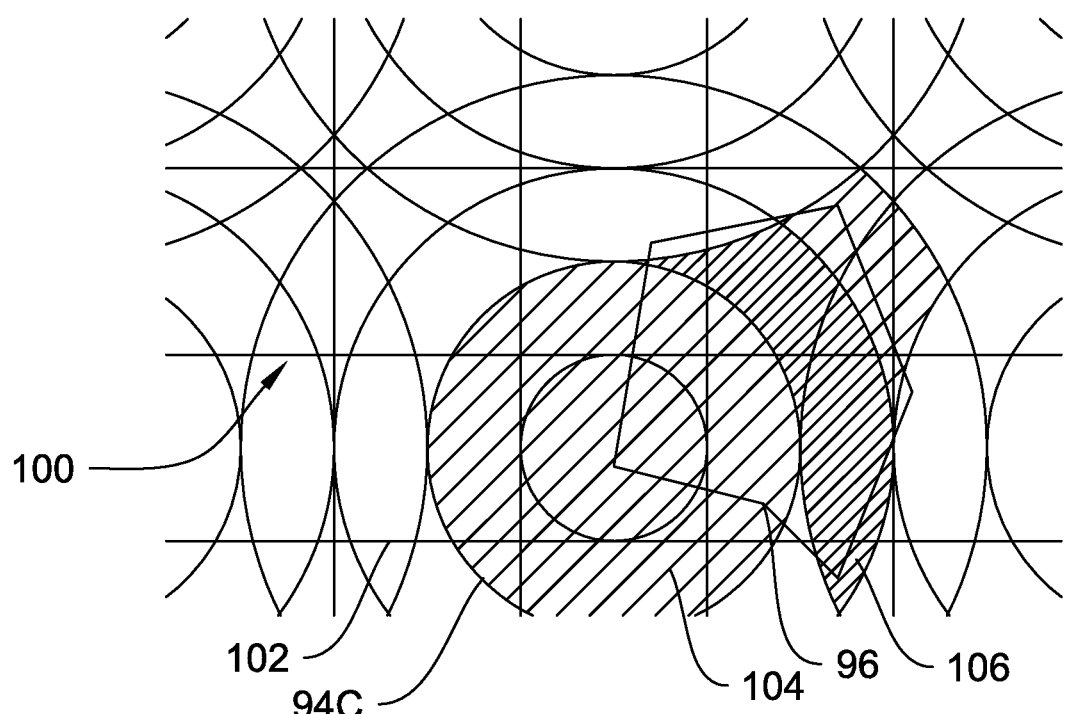
FIG. 8 shows the application of probabilities to focus areas and overlap regions of FIG. 7.
Figure 9:
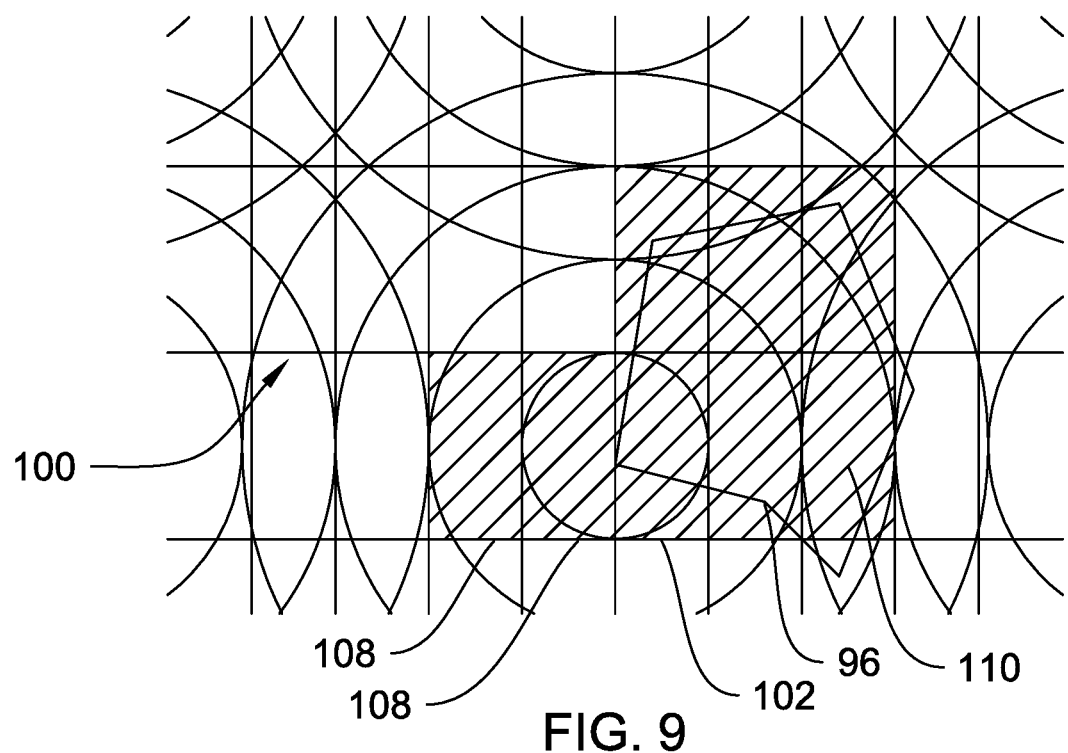
FIG. 9 shows the use of vertical portions to further analyze the pixels of FIG. 7.
Figure 10:
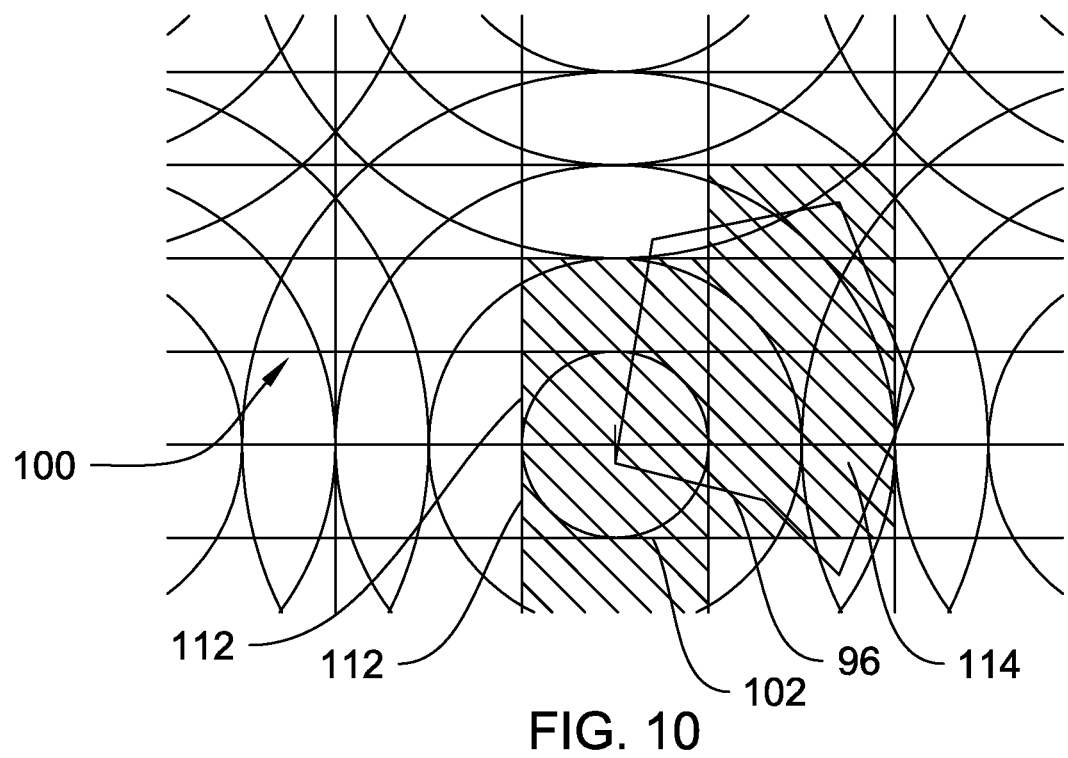
FIG. 10 shows the use of horizontal portions to further analyze the pixels of FIG. 7.

Pixels 102 can be refined into four subpixels using the following method. As shown in FIG. 9, each pixel 102 is divided evenly into vertical portions 108. Probabilities calculated from the intra-spot analysis and the inter-spot analysis shown in FIG. 8 are then mapped to the vertical portions. This can be performed by thresholding the portions 108 by filling an entire vertical portion 108 when the underlying probability indicates portion 108 should be filled. Portions with low probabilities or no probabilities are left blank. Single crosshatching 110 is used in FIG. 9 to show these filled portions. In FIG. 10 each pixel 102 is divided evenly into horizontal portions 112. Probabilities are mapped for these portions 112 utilizing the same technique as that used for the vertical portions 108. Horizontal portions 112 having a high probability are indicated with single crosshatching 114.

Figure 11:
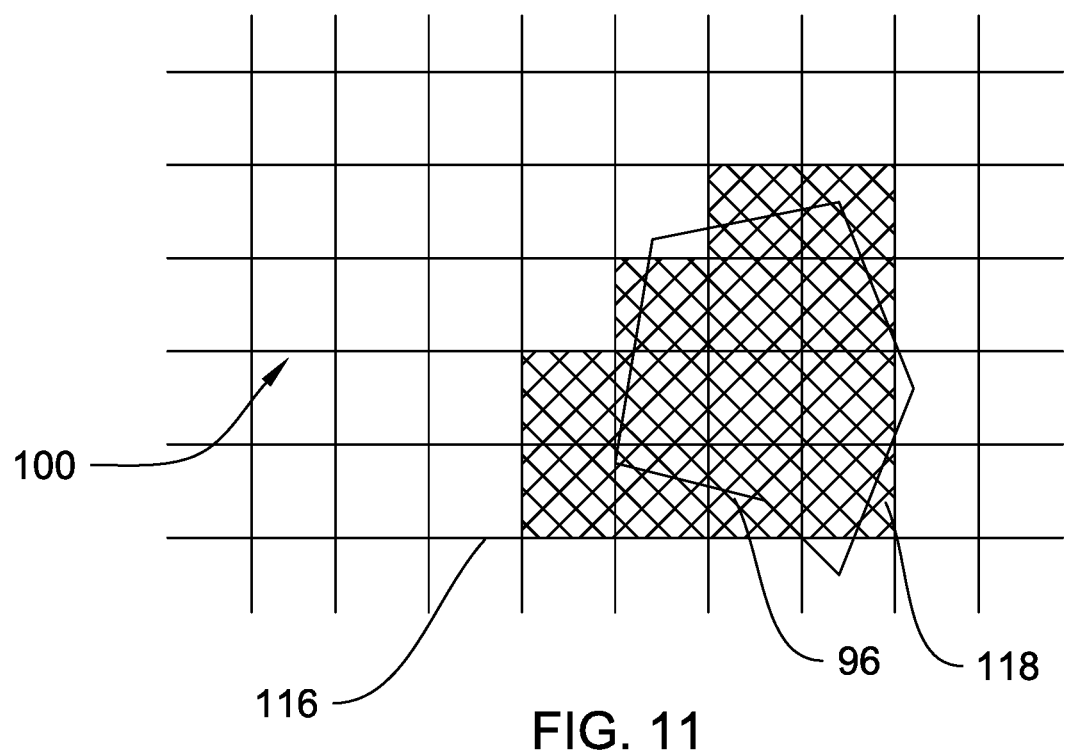
FIG. 11 shows the creation of subpixels from the vertical portions and horizontal portions.

FIG. 11 shows the formation of subpixels 116 by using the regions of overlap between vertical portions 108 and horizontal portions 112. This can be performed by utilizing an AND function between portions 108 and 112. High probability subpixels 116 are shown by a grid crosshatch 118. The subpixels 116 can then be used for display having twice the definition of original pixels 102.

Calculations can be simplified by assuming that the focal spot can be represented by the Airy disk and that all of the measured signal can be attributed to this portion of the Airy pattern. In reality, the measured signal could correspond to one of the outer rings on the Airy pattern. This assumption is used because it greatly simplifies the required calculations while yielding reasonable results in most cases. A more complete analysis could include this factor.

Lesser rings of the Airy pattern can be accounted for in an alternate embodiment. This can be achieved be defining the focal spot size not as the Airy disk (the area within the first intensity peak), but as including a number N of outer rings. Then applying equation (6) over the area of overlap can be used to determine the amount of signal attributable to that overlap. Thus, a smaller proportion of the return signal is attributable to the overlap. While it is possible that some of the return signal is from an area illuminated by the outer rings of the Airy pattern, it is less probable. Integrating equation (6) is beneficial because it provides greater accuracy than utilizing the proportion of area. Proportion of area assumes uniform intensity distribution which makes calculation easier but breaks down when computing intensities in the outer rings. Using the techniques herein, it is possible to more accurately perform the image processing analysis outlined in the previous sections.

It will be understood that these teachings can be applied to many different types of connectors and the descriptions herein are merely for illustrative purposes. There may be many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for processing a plurality of overlapping broadband returns to more precisely localize an object comprising the steps of:
   utilizing a transform to convert each overlapping broadband return into a plurality of wavelength based returns;
   grouping the plurality of wavelength based returns for a single overlapping broadband return into at least two wavelength group returns, said at least two wavelength group returns having different focal diameters;
   computing intra-return probabilities of object location from said at least two wavelength group returns for each wavelength group return;
   computing inter-return probabilities of object location from selected overlapping broadband returns that overlap each other utilizing wavelength group returns and computed inter-return probabilities for the selected overlapping broadband returns;
   establishing a pixel grid for displaying probabilities of object location, said pixel grid having pixels sized to the diameter of the wavelength group return associated with the smallest wavelength;
   mapping the calculated intra-return probabilities and calculated inter-return probabilities to the established pixel grid; and
   displaying the mapped probabilities of object locations on the pixel grid.

2. The method of claim 1 further comprising the steps of:
   analyzing all wavelength group returns to determine aggregate intensity levels for each wavelength group of returns; and normalizing intensity levels for each wavelength group return based on the determined aggregate intensity levels for allowing comparison of intensity levels in different wavelength group returns.

3. The method of claim 2 wherein the step of mapping and the step of displaying comprise the steps of:
separating each pixel of said established pixel grid into equal vertical portions;
mapping the calculated intra-return probabilities and calculated inter-return probabilities to the equal vertical portions;
separating each pixel of said established pixel grid into equal horizontal portions;
mapping the calculated intra-return probabilities and calculated inter-return probabilities to the equal horizontal portions;
determining subpixels as being the overlapping regions of the equal horizontal portions and the equal vertical portions;
combining the mapped horizontal portion probabilities and the mapped vertical portion probabilities to obtain subpixel probabilities; and
displaying the mapped probabilities of object locations of the subpixels of the pixel grid.

4. The method of claim 1 wherein the step of grouping the plurality of wavelength based returns comprises selecting the wavelengths of the wavelength group returns based on the expected object size.

5. The method of claim 1 wherein the step of grouping the plurality of wavelength based returns comprises selecting the wavelengths of the wavelength group returns based on the characteristics of the broadband pulse returns.

6. The method of claim 1 wherein the steps of computing intra-return probabilities of object location and computing inter return probabilities of object location includes applying Airy disk weightings to the wavelength group returns.

7. The method of claim 1 further comprising the steps of:
determining a noise floor for intensities of the wavelength group returns; and
setting wavelength group return intensities below the determined noise floor to zero.

8. The method of claim 7 further comprising the step of establishing wavelength group intensity levels as being a multiple of the determined noise floor.

9. A method for increasing accuracy in broadband imaging of an area of interest on a specimen comprising:
scanning the area by providing broadband pulses to known overlapping focus locations in the area of interest and receiving a plurality of broadband return values from the known overlapping focus locations;
storing the broadband return values from the known overlapping focus locations;
selecting wavelength groups for decomposition based on characteristics of the specimen, the broadband pulse, and a decomposing filter wherein each wavelength group includes a band of adjacent wavelengths;
decomposing each stored broadband return value from one location into a wavelength group return value for each selected wavelength group wherein each wavelength group has a focus region with a known radius;
calculating intra-pulse probabilities for object location among the wavelength group return values associated with a single location;
determining areas of wavelength group overlap related to wavelength groups from adjacent locations in the area of interest;
calculating inter-pulse probabilities of object location for the areas of wavelength group overlap;
defining a pixel array having a plurality of pixels to align with areas of wavelength group overlap and the wavelength group having the shortest wavelengths;
using the calculated intra-pulse probabilities, inter-pulse probabilities, smallest wavelength groups, and other wavelength groups to provide display values for the pixels in the pixel array; and
displaying pixels to provide a more detailed image of the area of interest.

10. The method of claim 9 further comprising the steps of:
analyzing the stored broadband return values to establish a noise floor for the broadband return values; and
thresholding the broadband return values such that broadband return values below the established noise floor are set to a base level.

11. The method of claim 9 further comprising normalizing wavelength group return values across all locations for each wavelength group to allow comparison of wavelength group return values from different wavelength groups.

12. The method of claim 11 further comprising the steps of:
establishing discrete levels for each wavelength group; and
categorizing each wavelength group return value associated with a location into one of the established discrete levels prior to the step of calculating most likely values.

13. The method of claim 9 further comprising the step of applying Airy disk weightings to each wavelength group return value associated with a location prior to the step a calculating intra-pulse probabilities the step of calculating inter-pulse probabilities.

14. The method of claim 9 wherein the provided broadband pulse is a pulse of electromagnetic energy having wavelengths from 0.03 mm to 3 mm.

* * * * *